United States Patent [19]

Shimirak et al.

[11] Patent Number: 4,950,343
[45] Date of Patent: Aug. 21, 1990

[54] METHOD OF CABLE SEALING

[75] Inventors: Gerald L. Shimirak, Danville; Paul S. Chan, San Franscisco, both of Calif.; Per Jensen, Slangerup, Denmark

[73] Assignee: Raychem Corporation, Menlo Park, Calif.

[21] Appl. No.: 241,642

[22] Filed: Sep. 8, 1988

[51] Int. Cl.$^5$ ............................................ H01B 13/06
[52] U.S. Cl. ....................................... 156/52; 156/86; 174/DIG. 8; 206/568; 428/34.9; 428/913
[58] Field of Search ...................... 156/49, 52, 85, 86, 156/273.9; 174/DIG. 8; 219/549; 264/105, 230; 428/34.9, 913; 206/223, 568

[56] References Cited

U.S. PATENT DOCUMENTS

| | | | |
|---|---|---|---|
| 4,388,607 | 6/1983 | Toy et al. | 252/511 X |
| 4,400,614 | 8/1983 | Soporm | 264/105 X |
| 4,445,026 | 4/1984 | Walker | 252/511 X |
| 4,514,620 | 4/1985 | Cheng et al. | 264/105 X |
| 4,517,449 | 5/1985 | Chazan et al. | 219/549 |
| 4,569,868 | 2/1986 | De Blauwe et al. | 428/35 |
| 4,570,055 | 2/1986 | McMills | 219/541 |
| 4,579,148 | 4/1986 | Sovish et al. | 138/89 |
| 4,743,321 | 5/1988 | Soni et al. | 156/86 X |
| 4,881,995 | 11/1989 | Arenz | 156/52 |

FOREIGN PATENT DOCUMENTS

| | | |
|---|---|---|
| 0128664 | 12/1984 | European Pat. Off. . |
| 0307198 | 3/1989 | European Pat. Off. . |
| 2369710 | 5/1978 | France . |
| 2369912 | 6/1978 | France . |

Primary Examiner—Robert A. Dawson
Attorney, Agent, or Firm—A. Stephen Zavell; Herbert G. Burkard

[57] ABSTRACT

A cable is sealed at a conduit such as an outlet from a housing and preferably also terminated and blocked by shrinking over it a conductive polymer article having at least three portions. An end portion is shrunk to engage cable jacket, an intermediate portion is heat-shrunk to drive an adhesive into interstices between the conductors of the cable, and an opposite end portion is shrunk to engage the conduit.

22 Claims, 7 Drawing Sheets

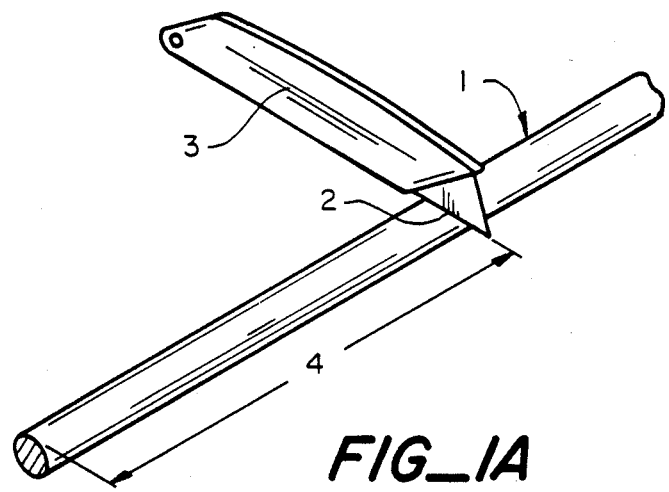
FIG_1A
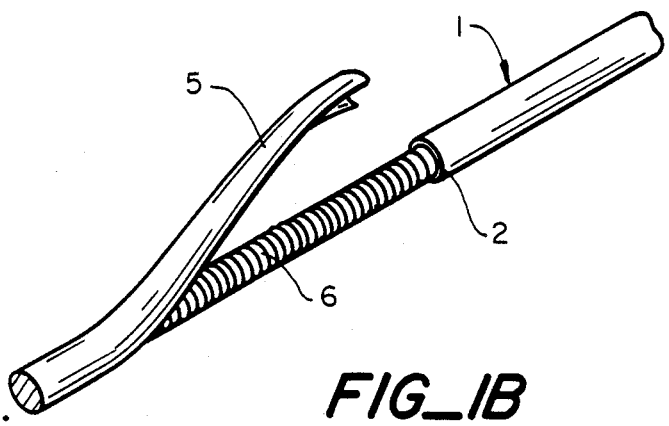
FIG_1B
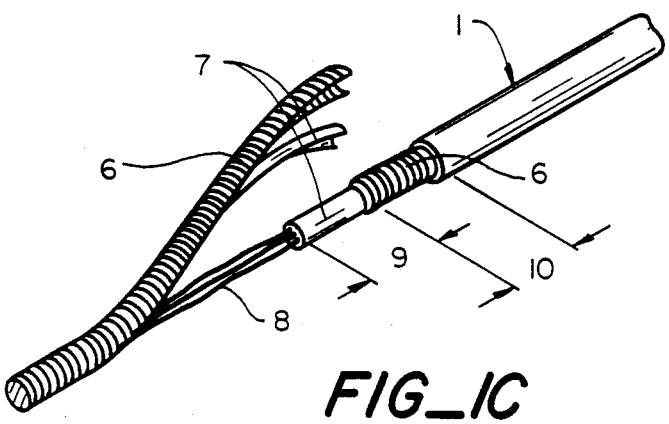
FIG_1C

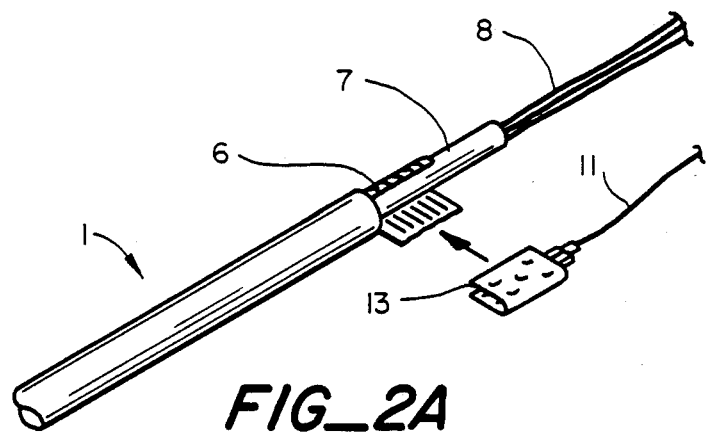
FIG_2A
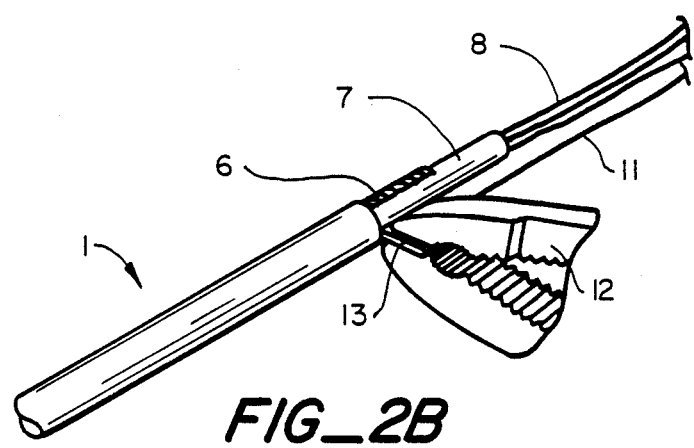
FIG_2B
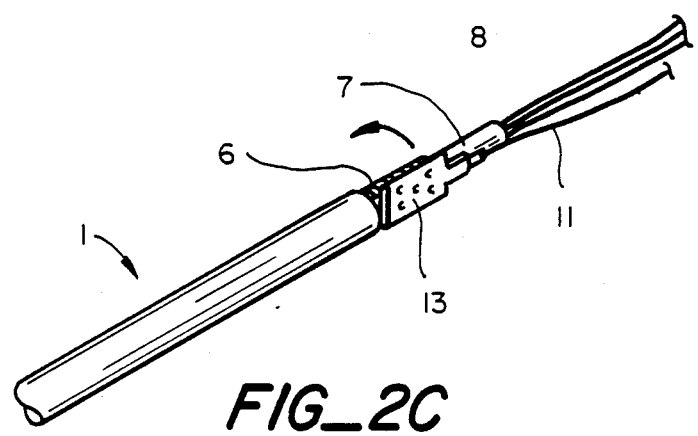
FIG_2C

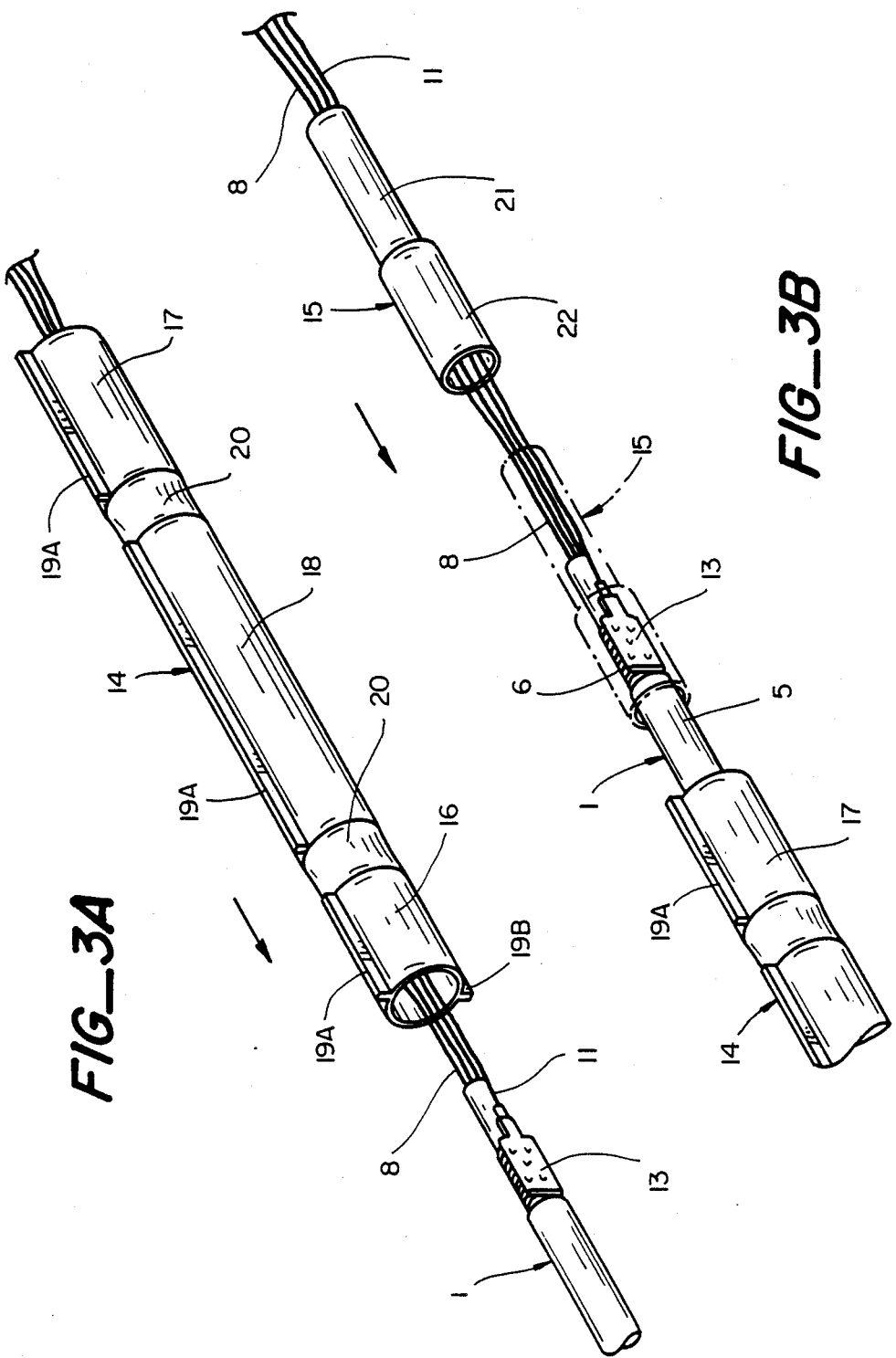

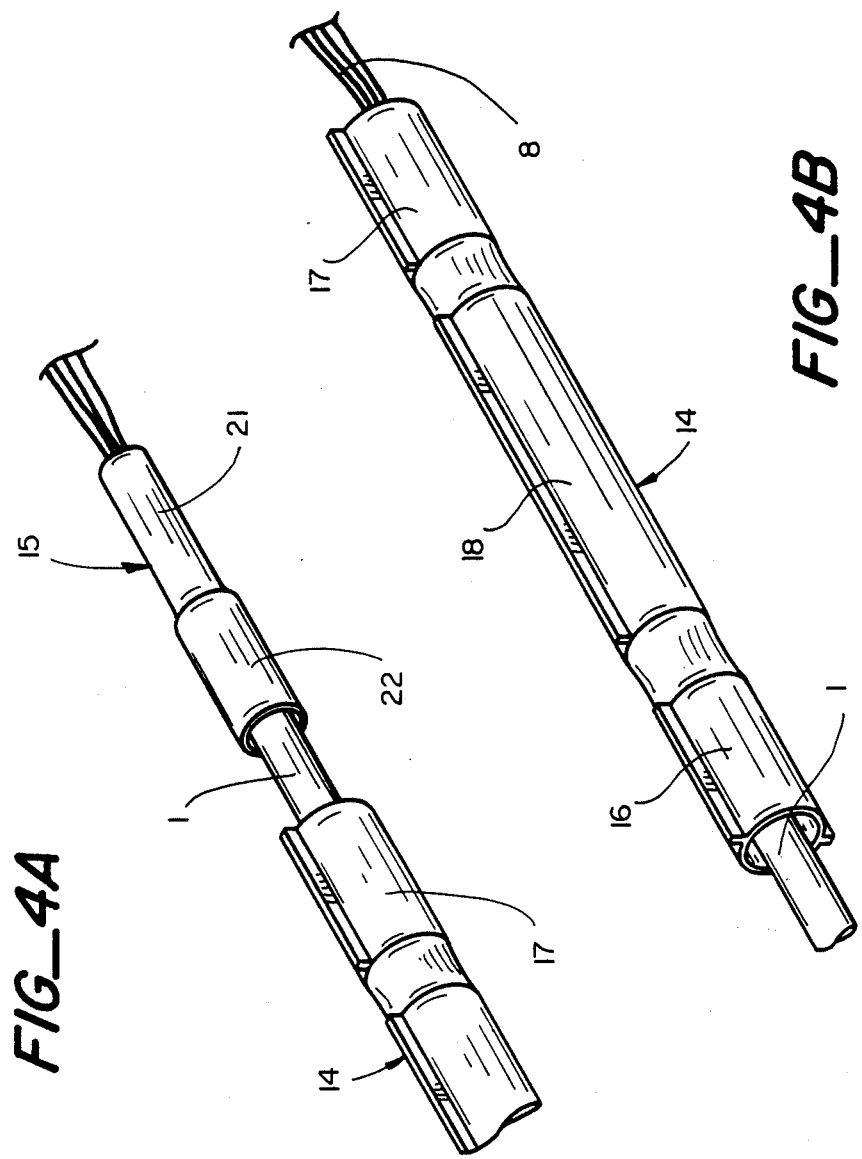

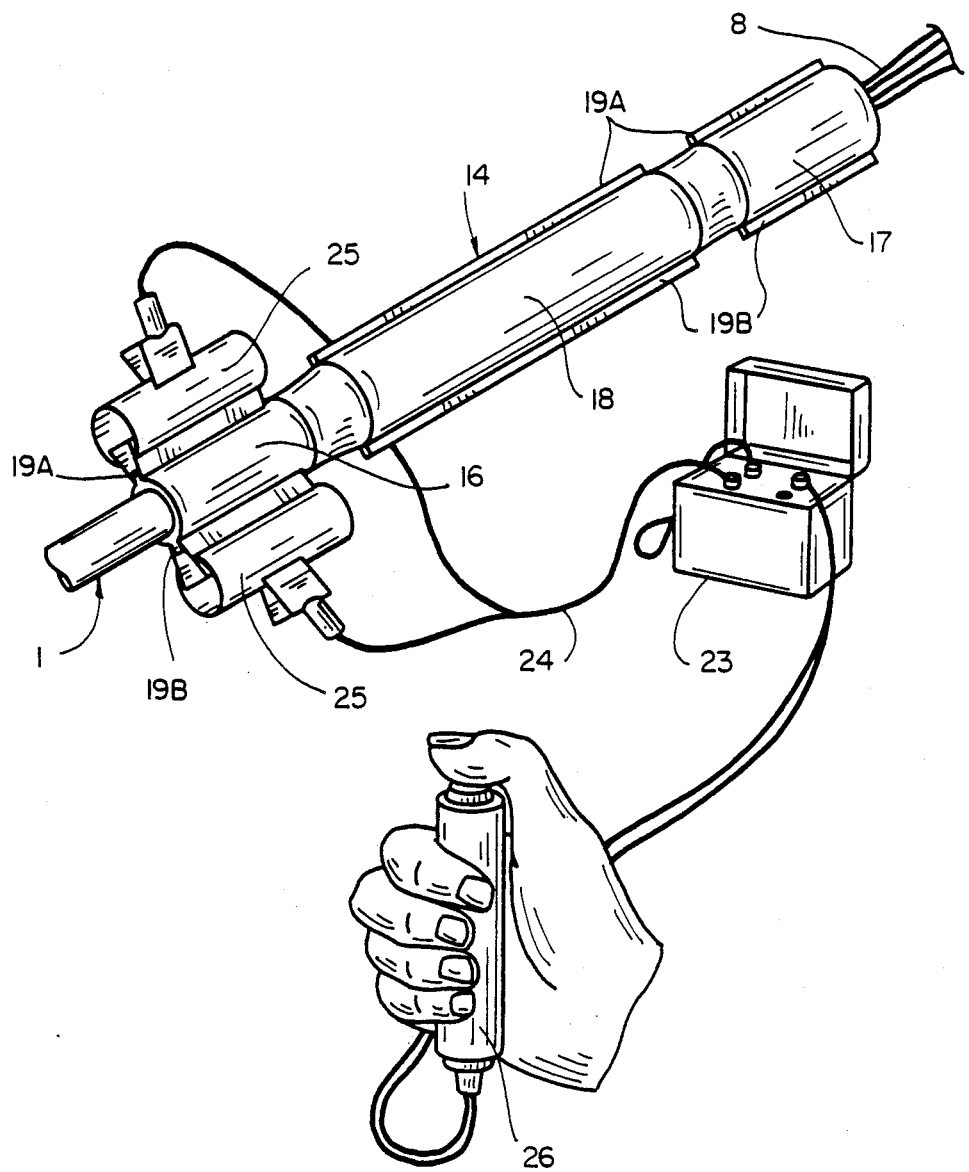
FIG_5

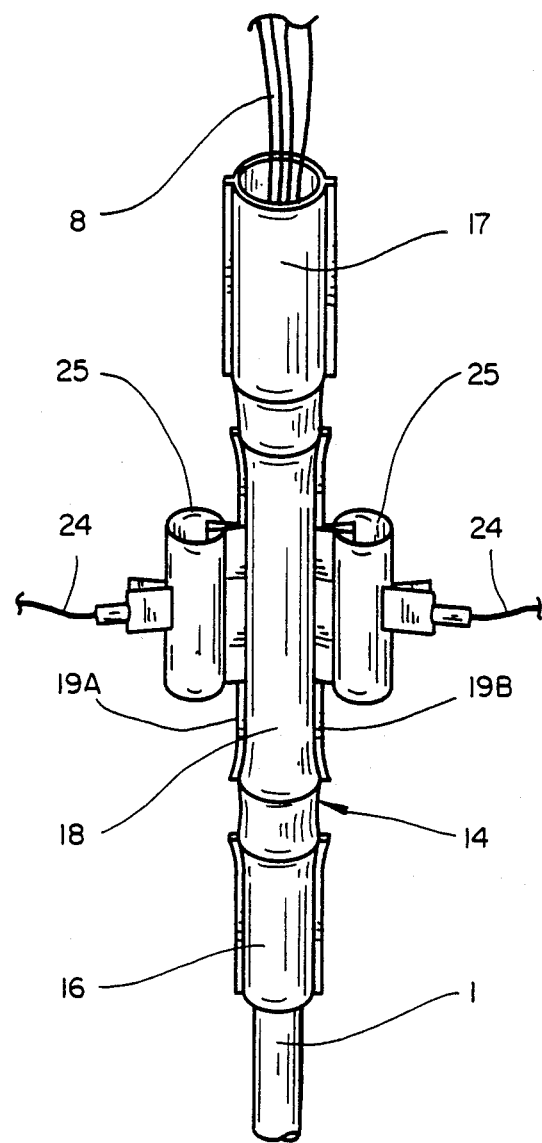
FIG_6

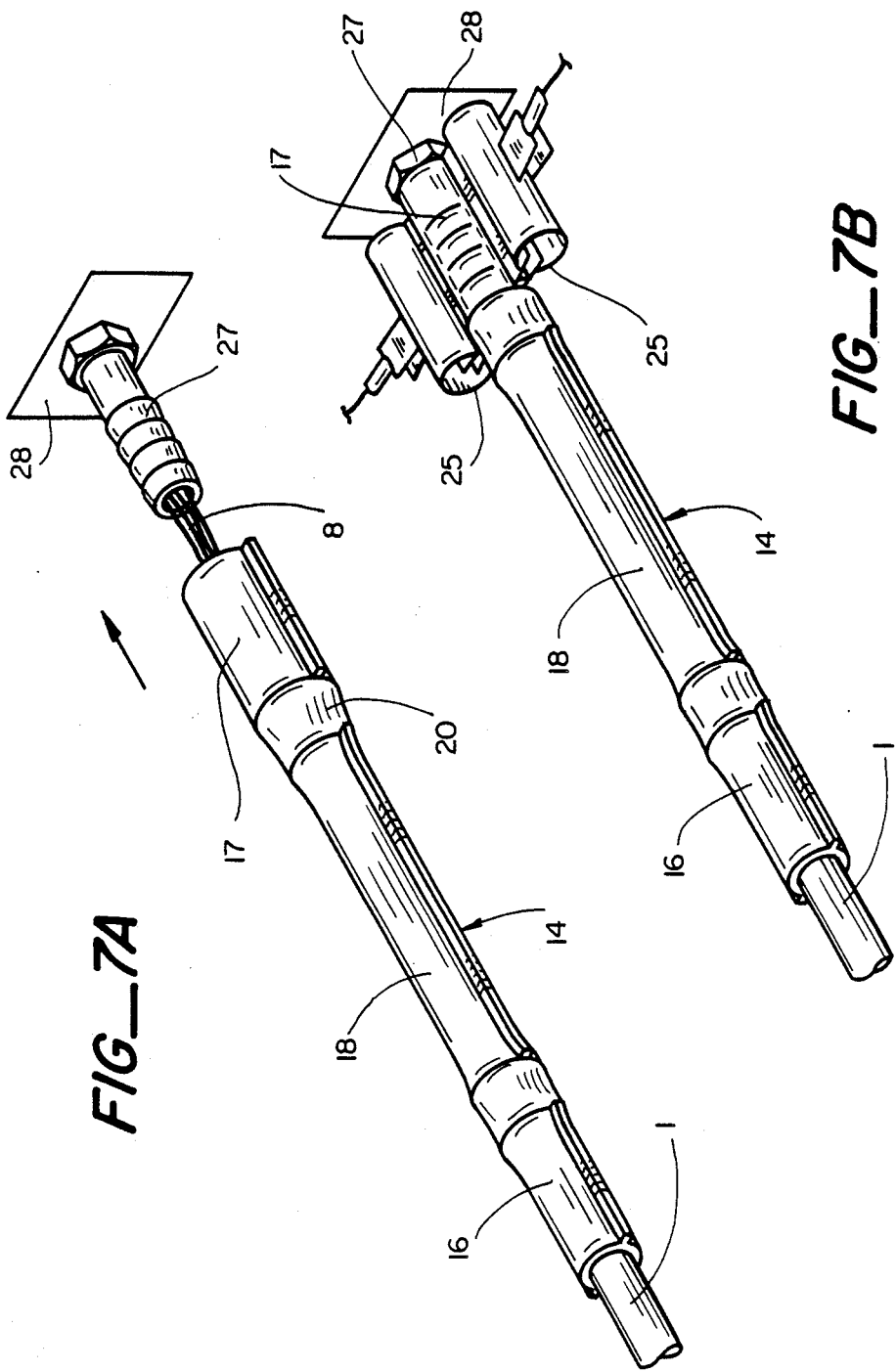

METHOD OF CABLE SEALING

FIELD OF THE INVENTION

This invention relates to a method of cable sealing using an article which comprises a conductive polymeric material, which can be heated by passing electrical current through the conductive polymeric material.

BACKGROUND TO THE INVENTION

Conductive polymeric materials and devices incorporating them are well known. Reference may be made for example to the following, the disclosure of each of which is incorporated herein by reference U.S. Pat. Nos. 2,952,761, 2,978,665, 3,243,753, 3,351,882, 3,571,777, 3,658,976, 3,757,086, 3,793,716, 3,823,217, 3,858,144, 3,861,029, 3,950,604, 4,017,715, 4,072,848, 4,085,286, 4,117,312, 4,151,126, 4,177,376, 4,177,446, 4,188,276, 4,237,441, 4,242,573, 4,246,468, 4,250,400, 4,252,692, 4,255,698, 4,271,350, 4,272,471, 4,304,987, 4,309,596, 4,309,597, 4,314,230, 4,314,231, 4,315,237, 4,317,027, 4,318,881, 4,327,351, 4,330,704, 4,334,351, 4,352,083, 4,361,799, 4,388,607, 4,398,084, 4,413,301, 4,425,397, 4,426,339, 4,426,633, 4,427,877, 4,435,639, 4,429,216, 4,442,139, 4,459,473, 4,470,898, 4,481,498, 4,476,450, 4,502,929; 4,514,620, 4,517,449, 4,534,889, and 4,560,498; J. Applied Polymer Science 19, 813–815 (1975), Klason and Kubat; Polymer Engineering and Science 18, 649–653 (1978), Narkis et al; European Application Nos. 38,713, 38,714, 38,718, 74,281, 92,406, 119,807, 133,748, 134,145, 144,187, 157,640, 158,410, 175,550 and 176,284; and Japanese Published Patent Application No. 59-122,524.

A heat-recoverable article is an article the dimensional configuration of which may be made substantially to change when subjected to heat treatment. Usually these articles recover, on heating, towards an original shape from which they have previously been deformed, but the term "heat-recoverable", as used herein, also includes an article which, on heating, adopts a new configuration, even if it has not been previously deformed.

Heat recoverable articles are known. In their most common form, such articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form. In other applications, a preformed dimensionally heat stable article is deformed to a dimensionally heat unstable form in a separate stage.

In other articles, an elastomeric member is held in a stretched state by a second member, which, upon heating weakens and thus allows the elastomeric member to recover. Heat-recoverable articles of this type are described, for example, in British Patent 1,440,524 in which an outer tubular elastomeric member is held in a stretched state by an inner tubular member. Alternatively, the "hold-out" layer could be on the outside.

Heat-recoverable articles which comprise conductive polymeric materials, and which use ohmic heating of those materials to cause heat recovery are also known. Reference may be made for example to GB 1265194 (MP099), U.S. Pat. No. 4,085,286 (MP192), U.S. Pat. No. 4,017,715 (MP0212), U.S. Pat. No. 4,421,582 (MP0219), European Patent Publication No. 0157640 (MP0922) and U.S. Pat. No. 4,570,055 (MP0939).

It is also known to be desirable to use for a conductive recoverable article, a material which exhibits a PTC (positive temperature coefficient of resistivity) effect, that is a sharp rise in resistivity at a particular, or over a short range of temperatures. This temperatue or temperature range is known as the anomaly or switching temperature. Typically the material is selected to exhibit the sharp rise in temperature at or slightly above the recovery temperature of the article. The PTC effect minimises overheating and consequent so-called "thermal runaway" of the material. Materials which exhibit a PTC effect are typically referred to simply as PTC materials.

SUMMARY OF THE INVENTION

We have now designed a new conductive polymer article which can be electrically installed, preferably electrically heat-recovered, and can be used to seal a cable termination or splice, preferably by forming a cable block, and preferably by a method involving independent electrical heating of various parts of the article.

Thus the invention provides a method of sealing a cable at a conduit through which the cable passes, which comprises:
(a) providing a tubular article comprising conductive polymeric material and having two or more elongate electrodes extending at least part way along the length of the article, at least one of which elongate electrodes is interrupted so that an electrical power source can be selectively connected to the article to cause electrical current to pass through
   (i) a first heat-shrinkable end portion of the article
   (ii) a second heat-shrinkable end portion of the article being opposite to the first end portion; and
   (iii) an intermediate portion, between the first and second end portions.
(b) positioning the tubular article around the cable such that the first end portion surrounds the cable and the second end portion surrounds the conduit;
(c) connecting an electrical power source to the electrodes such that electrical current passes through the first end portion causing the first end portion to shrink into engagement with the cable; and
(d) connecting an electrical power source to the electrodes such that electrical current passes through the second end portion causing the second end portion to shrink into engagement with the conduit.

The invention also provides a kit-of-parts which comprises:
(a) a tubular article comprising conductive polymeric a material and having two or more elongate electrodes extending at least part way along the length of the article, at least one of which elongate electrodes is interrupted so that an electrical power source can be selectively connected to the article to cause current to pass through
   (i) a first heat-shrinkable end portion of the article
   (ii) a second heat-shrinkable end portion of the article being opposite to the first end portion, and
   (iii) an intermediate portions, between the first and second end portion; and
(b) a heat-activatable sealing material in the form of a tube that can be positioned within the tubular article.

DETAILED DESCRIPTION OF THE INVENTION

An article according to, and used in the method of, the invention may be tubular and have elongate electrodes extending along its length which when connected to a source of electrical power causes electrical current to flow between the electrodes around the circumference of the article. In order to heat and/or recover selected parts only of the article, the electrode (which preferably extends along the substantially entire length of the article) may be interrupted.

British Patent Application Nos. 8723752 and 8729122 and U.S. equivalent filed contemporaneously herewith (U.S. Ser. No. 241,658 filed Sept. 8, 1988), the disclosure of which is incorporated herein by reference, disclose an article that may be used in the present invention, namely a tubular article comprising conductive polymeric material having two or more elongate electrodes extending at least part way along the length of the article, at least one of which elongate electrodes is interrupted so that an electrical power source can be selectively connected to the article to cause electrical current to pass through a first length only of the article.

The term "interrupted" means that there is a discontinuity in the length of the electrode. The interrupted electrode may have been made by starting with a longer continuous electrode and removing part of its length (other than at one end). Alternatively the "interrupted" electrode may be made by applying or otherwise forming at least two discrete electrode lengths. There preferably is no direct, low resistance, electrical connection between the parts of the interrupted electrode.

Tubular articles according to the invention may be of open (wraparound) or closed cross-section. When tubular articles are used they may be open at one or both ends.

As used herein the term "wraparound" means an article which can be wrapped around a substrate, with longitudinal edges secured together to form a tubular article around the substate. The term does not include wrapped tape.

A feature of this article is that it can be made in a continuous process in long lengths and then later cut to the desired length.

The above arrangement enables the first length of the interrupted electrode(s), on one side of the interruption, to be connected to a source of electrical power independently of the remaining part of the electrode. Several interruptions may be made in the electrodes if desired. This invention is advantageous where it is desirable to heat or recover only one part of the tubular article, or where it is desired to heat or recover that portion at a different time. For example, one part of an article may be heated to activate or cure an underlying adhesive or sealant before a second part is heated. One or more parts of the article can be used to deliver adhesive or sealant to an area before another part of the article is heated.

The article according to the invention may be expanded to render it recoverable or it may be non expanded, and hence heat-stable. Thus the article may be a recoverable cover and/or heater or a heat stable heater.

British Patent Application 8810522 (DK003 GB5) [U.S. Ser. No. 241,749 filed Sept. 8, 1988], describes a heat recoverable article (preferably tubular) which comprises electrically conductive recoverable material, and is provided with at least two integrally formed spaced apart support elements. The support elements also comprise electrically conductive material and are dimensionally heat stable, so that they remain undeformed during recovery, other than bending to accommodate transitions. The arrangement ensures good contact is maintained throughout recovery of the article. This arrangement is suitable for use in the present invention, the electrodes (which are interrupted, or are to be interrupted) being positioned on or in the support elements, which are typically in the form of elongate flanges.

British Patent Application 8723760 (DK004 GB3) and U.S. equivalent filed contemporaneously herewith (U.S. Ser. No. 242,089 filed Sept. 8, 1988), the disclosure of which is incorporated herein by reference describes a heat recoverable conductive polymeric, preferably tubular, article with longitudinal electrodes extending part way only along its length.

British Patent Application 8814688, and application DK005 FF and U.S. equivalent filed contemporaneously herewith (U.S. Ser. No. 242,081 filed Sept. 8, 1988), the disclosures of which are incorporated herein by reference, disclose articles comprising a material with specific electrical properties to control the direction of current flow. One article according to DK005 has been expanded from X% to Y% to make it heat recoverable, the article comprising a conductive polymeric material the resistivity of which decreases on expansion, as measured in the direction of current flow, in at least part of the X-Y% expansion range. Another article according to the invention is heat recoverable and comprises a conductive polymeric material which has a resistivity which increases on recovery, as measured in the direction of current flow, through the temperature range 20° C. to $T_e$ (extrapolated end temperature, as measured according to ASTM D3418-82).

Other articles according to that invention have a so-called pseudo-PTC ratio (peak resistivity: resistivity at 25° C. in the range 1½ to 10, and are connected to electrodes so that current flows parallel to the faces of the article. Preferred articles are expanded to render them recoverable and the resistivity of the composition of the articles decreases in at least part of the expansion range when expanded by 25% or more, for example by 25-500%.

British Patent Application 8805072 (RK352-A GB1) and U.S. equivalent filed contemporanously herewith (U.S. Ser. No. 241,643 filed Sept. 8, 1988), the disclosure of which is incorporated herein by reference describes a tubular article which comprises a conductive polymeric material and is preferably heat recoverable and which can apply a radially inward force on a substrate therein. This can be used to join or repair a substrate e.g. a cable or a pipe. It can, for example, melt a polymeric patch between the article and the substrate. It is preferably multi-part or wraparound, for easy installation.

British Patent Application 8723762 (DK006 GB) and U.S. equivalent file contemporaneously herewith U.S. Ser. No. 241,659 filed Sept. 8, 1988), the disclosure of which is incorporated herein by reference describes a tubular conductive polymeric article which increases in thickness on recovery. It preferably has three longitudinal sections, which are all electroded separately. The end sections shrink radially, and the central section increases in thickness. According to the present invention, the longitudinal sections may comprise interrupted elongate electrodes.

The interrupted electrodes of the present invention may be used in any of the above described articles.

As mentioned above, in preferred embodiments the electrodes are provided in or on longitudinal flanges extending along the length of the article. Such an arrangement is described in British Patent Application No. 8810522 (DK003 GB5) and U.S. equivalent file contemporaneously herewith (U.S. Ser. No. 241,749 filed Sept. 8, 1988), the disclosure of which is incorporated herein by reference. In these cases the interruption in the electrodes is preferably effected by making a cut through the flanges and associated electrodes, so that there is an electrically insulating space between the cut ends of the electrode.

A novel method may be used of making a selectively heatable or selectively recoverable tubular article comprising:
(a) forming a tubular article comprising conductive polymeric material,
(b) providing two or more longitudinal electrodes extending along the article,
(c) interrupting the electrical continuity of at least one electrode, thereby defining a first electrode part which can be connected to an electrical power source and a remaining electrode part which can be separately connected to an electrical power source.

In a preferred embodiment the tubular article is provided with longitudinal conductive polymeric flanges extending along at least part of the length of the article, and the electrodes are provided in or on these flanges. In this case the electrical continuity of the electrode(s) may be interrupted, for example, by cutting and removing a section of each flange, part-way along the length of the electrode(s). Where the electrodes are provided on the surface of the flanges or the surface of the body of the article, e.g. by silver conductive ink or paint, they may be mechanically removed, e.g. by abrading.

As an alternative the electrodes may be provided interrupted in the first instance. Thus a novel selectively heatable or selectively recoverable tubular article may be used comprising:
(a) a tubular article comprising conductive polymeric material, and
(b) three or more longitudinal electrodes extending along the article, at least two or which extend along the same line but are separated from each other.

The two electrodes that are separated from each other may nonetheless be electrically connected via a higher resistivity medium (i.e. the conductive polymeric material of the main body of the article). There is however preferably no direct low resistance electrical connection between the electrodes. Also there may be a mass of insulating material between the separated electrodes.

Preferred compositions for use in the present invention are described in British Patent Application 8729123 (RK365 GB1), and U.S. equivalent filed contemporaneously herewith U.S. Ser. No. 241,660 filed Sept. 8, 1988), the disclosure of which is incorporated herein by reference.

One material that can be used is 59.4 parts by weight Elvax 460 (an E.V.A. of 18% by weight vinyl acetate content and a melt flow index of 2.5, as supplied by Du Pont), 39.6 parts by weight of Vulcan P (a carbon black supplied by Cabot Corporation) and 1 part by weight antioxidant. Other suitable examples are:

| Polymer (parts by weight) | Carbon Black (parts by weight) | Antioxidant (parts by weight) |
|---|---|---|
| Marlex* HXM 50100 (59.4) | Vulcan* P (39.6) | (1.0) |
| Elvax* 460 (59.4) | Sevalco* N110 (39.6) | (1.0) |
| Sclair* 11D-1 (59.4) | Ensaco* MS (39.6) | (1.0) |
| Elvax* 770 (59.4) | Vulcan* P (39.6) | (1.0) |

*represents a trademark.

The polymeric materials used were as follows:
Marlex is a HDPE supplied by Phillips
Elvax 460—described earlier
Sclair 11D-1 is a LLDPE supplied by Du Pont, Canada
Elvax 770 is an EVA supplied by Du Pont.
Vulcan P, Ensaco MS and Sevalco N110 carbon blacks are supplied by Cabot Corporation, Ensagri Willebroek NV and Sevalco Ltd respectively.

One preferred article according to the invention is a tubular article which has been expanded radially and has two or more, preferably three separately radially shrinkable sections. The article preferably comprises longitudinally separated pairs of electrodes (one pair for each separately radially shrinkable section) arranged to shrink each of the sections. Thus, such an article is suitable for cable blocking a cable splice or termination, e.g. a splice between or termination of an optical fibre cable. For this application there may be three separately radially shrinkable sections. The central section may contain a large mass of adhesive, or other sealing material sealant, for cable blocking. The end sections may be lined with adhesive, e.g. a hot melt adhesive, for bonding to the cables or to some housing at which the cable is to be terminated.

For cable blocking and similar applications, there is not necessarily a requirement for the inner surface of the article to be smooth (since the substrate may not be smooth). Thus in the preferred case where the electrodes are provided on heat stable flanges projecting from the surface of the article (as described in British Patent Application 8810522 (DK003 GB5) these flanges may project outwardly from or inwardly into the article, or both.

The article may employ a conductive polymeric hold-out layer which holds in a stretched state an elastomeric layer. The hold-out layer may be the inner or outer layer. The elastomeric layer is allowed to recover when the conductive layer heats.

Where the article is tubular with one or more open ends, it may be desirable to seal between two or more substrates exiting the open end. This can be achieved using a branchoff clip (e.g. as disclosed in U.S. Pat. No. 4,648,924) which brings together circumferentially spaced portions of the walls of the article between the substrates. An electrically heated branch-off clip may be used. As an alternative an electically heated filling piece may be used. The electrically heated clip and filling piece may be powered by the same power supply that is used to heat and recover the article.

In articles according to the invention, the wall thickness of the article may be varied along its length. Also two or more layers of different materials may be used. The second or additional layer may extend along the whole or along part of the length of the article. They may have electrical properties e.g. room temperature resistivity and resistivity/temperature behaviour, that are the same as, or different to, that of the first material.

As an example, the second or subsequent layers may comprise a material that exhibits traditional PTC behavior or ZTC (zero temperature coefficient of resistivity) behaviour. The effect of the additional layers(s) is that it (they) provide additional material through which electrical current can flow, and hence provide additional heating. By appropriate choice of the resistivity of the material of the additional layer(s) greater heating can be achieved than would be the case were a similar additional thickness of the first material used. This may be advantageous, for example to decrease recovery times in certain regions, or where a higher temperature is required. Therefore in some preferred embodiments second or subsequent layers of material different to the first material are added in selected regions.

Another example of using two layers of different materials is where certain properties, e.g. flame retardancy, solvent resistance, abrasion resistance, electrical insulation, impact resistance, colour coding are required.

Where two or more layers are used these may be applied separately, for example by sequential extrusion or may be co-extruded.

The present invention may be ultilised in a variety of articles of different shapes. They are generally tubular, including wraparounds.

Embodiments of the invention will now be described by way of example with reference to the accompanying drawings wherein:

FIGS. 1(A–C) and 2(A–C) show cable preparation,

FIGS. 3(A and B) and 4(A and B) show positioning of a tubular article and adhesive tube FIG. 5 shows powering a first end portion of the tubular article FIG. 6 shows powering of an intermediate portion of the tubular article, FIG. 7(A and B) shows positioning of the article on a conduit, and powering of a second end portion.

FIG. 1 shows preparation of a cable that is to be sealed, and optionally terminated and/or blocked at an end portion of a conduit such as an outlet of a housing. The cable may contain copper or optical fibre conductors. The housing may, for example, comprise a subscriber interface unit or other point in a telecommunications systems.

In FIG. 1 a cable 1 is shown, a cut 2 being made by a knife 3. The distance 4 is preferably from 40–50 cms. The end portion of jacket 5 is then removed, exposing shield 6. An end portion of the shield 4 is then removed, together with inner wrap 7 to expose conductors 8. Short lengths of shield and inner wrap are preferably left exposed, the distances 9 and 10 each preferably being from 1–2 cm.

The conductors may then be cleaned using a solvent and the jacket may be abraded and/or flame treated if desired.

FIGS. 2A, 2B and 2C show attachment of a bond wire 11 to the shield. It can be seen to be attached by a crimp 13 using, for example, a pair of pliers 12.

The present invention may be used with other designs of cable and with other cable preparation techniques, but those described above are preferred.

FIGS. 3A and 3B show a tubular conductive polymer acticle 14 and an adhesive tube 15 being positioned over an end of a cable 1 prepared as described above.

The article 14 can be seen to have a first end portion 16, a second, opposite, end portion 17 and an intermediate portion 18 between them. Flanges or other electrodes 19 are provided along the length of the article 14, each portion 16, 17 and 18 having first and second flanges 19A, 19B, separated by about 180° around the circumference of the article. The flanges of each section are preferably substantially colinear, but they may be angularly separated. The flanges 19A and 19B of each portion 16, 17, 18 are preferably separated from the flanges of an adjacent portion by an insulating space 20. The space 20 may comprise a tubular portion of greater or less (as illustrated) diameter than those of the portions 16, 17 and 18.

In FIG. 3A the tubular article 14 is slid over the cable 1 to the position illustrated in FIG. 3B with the prepared portion 17 of the article. The adhesive tube 15 is preferably slid over the prepared end of the cable to the position where it is shown dotted. The adhesive tube preferably has a portion 21 of smaller cross-section which lies over the conductors 8 and a portion 22 of larger cross-section that lies over the shield 6 and crimp 13, and preferably also over the jacket 5. The tubular article is then move back to the right as drawn to lie over the adhesive tube. This is shown in FIGS. 4A and 4B.

The portion 21 of the adhesive tube 15 of smaller cross-section preferably has a length of from 0.75 to 1.25 times the length of the intermediate section 18 of the article 15, and the portion 22 of larger diameter preferably has a length of from 0.25 to 0.75 times the length of the first end portion 16 of the article 14.

The article 14 preferably has a length of from 12–36 cms, more preferably 20–30 cms, and a diameter of from 1.5 to 5 cm, more preferably 1.5–3 cm. The article 14 is preferably of substantially circular cross-section, and where it is non-circular the figures for diameter relate to circles of corresponding circumference.

The adhesive or other sealing material tube may comprises a simple tubular sheet of adhesive but it may comprise adhesive in other form for example as granules or fibres held in a tubular configuration by means of some packaging such as a mesh bag.

The first portion 16 of this article 14 is then heated in order to cause it to shrink into engagement with the cable 1. As shown in FIG. 5, an electrical power source 23 is connected to the flanges or other electrodes 19A and 19B of the first portion 16 by means of a power cord 24 and clips 25. The clips 25 preferably distribute electrical power over a significant length of each flange, preferably over at least 1.5 cms more preferably at least 2 cms, especially at least 3 cm. The power source may be controlled by a switch 26. A heating time of from 30–90 seconds, preferably about 60 seconds will generally suffice. This may be automatically controlled by the power supply, but it may be preferred to provide a temperature indicating paint on the article that changes colour when sufficient heat has been generated.

FIG. 6 illustrates heat-shrinkage of the intermediate portion 18 and heat-activation of the internal adhesive tube, which is preferably carried out after the first portion has been heat-shrunk into engagement with the cable 1 but before heat-shrinkage of the second end portion 17. This heating step preferably lasts 60–120 seconds, more preferably about 90 seconds. The article is preferably held substantially vertically while the intermediate portion is heated and for a further while (say about 60 seconds) while the article cools in order to prevent heat-activated adhesive (which in the case of holt-melt adhesive will be molten) being lost from the open end of the article. Some form of adhesive dam could however be used. A further possibility is to close the open end, for examply by heat-shrinkage and then shrink the intermediate portion. The activated adhesive will be displaced by the shrinking intermediate portion into interstices between conductors 8 of the cable 1.

The conductors 8 are then passed through the conduit 27 which may be an outlet of a housing 28 such as a subscriber interface unit or other point in a telecommunications system, or a bulkhead through which the cable 1 is to pass. Other housings may comprise splice closures or distribution closures for example those known by the Raychem trade marks RADI and FOSC. The article 14 is moved in the direction of the arrow in FIG. 7a until it is at the position shown in FIG. 7b, where the second end portion 17 is heat-shrunk into engagement with the conduit 27. Heating time is preferably similar to that suggested for the first end portion.

In this way the cable 1 is sealed at the conduit 27, and in addition the cable may be terminated and blocked thus preventing the passage of moisture or other contaminants along its length between its conductors. The article may also provide strain relief between the cable and the conduit.

For the avoidance of doubt it is here noted that the invention provides methods and articles for sealing, terminating and/or blocking a cable using a locally heatable article. Any one or more of the article designs, material formulation or installation techniques may be chosen.

We claim:

1. A method of sealing a cable at a conduit through which the cable passes, which comprises:
   (a) providing a tubular article comprising conductive polymeric material and having two or more elongate electrodes extending at least part way along the length of the article, at least one of which elongate electrodes is interrupted so that an electrical power source can be selectively connected to the article to cause electrical current to pass through
      (i) a first heat-shrinkable end portion of the article
      (ii) a second heat-shrinkable end portion of the article being opposite to the first end portion; and
      (iii) an intermediate portion, between the first and second end portions.
   (b) positioning the tubular article around the cable such that the first end portion surrounds the cable and the second end portion surrounds the conduit;
   (c) connecting an electrical power source to the electrodes such that electrical current passes through the first end portion causing the first end portion to shrink into engagement with the cable; and
   (d) connecting an electrical power source to the electrodes such that electrical current passes through the second end portion causing the second end portion to shrink into engagement with the conduit.

2. A method according to claim 1, in which step (c) is carried out before step (d).

3. A method according to claim 1, in which the intermediate portion is heat-shrinkable, the method additionally comprising:
   (e) connecting an electrical power source to the electrodes such that electrical current passes through the intermediate portion causing the intermediate portion to shrink into engagement with the cable.

4. A method according to claim 3, in which steps (c) (d) and (e) are carried out in the order (c) then (e) then (d).

5. A method according to claim 1, which additionally comprises:
   (f) positioning a heat-activatable sealing material around the cable at the intermediate portion of the article; and
   (g) connecting an electrical power source to the electrodes such that electrical current passes through the intermediate portion causing the intermediate portion to heat-activate the sealing material.

6. A method according to claim 5, in which the sealing material has the form of a tube and step (f) comprises sliding the tube of sealing material over an end of the cable.

7. A method according to claim 6, in which the tube of sealing material has a first portion of larger cross-section and a second portion of smaller cross-section, the cable comprising a plurality of conductors surrounded along part of their length by a jacket, the tube being positioned with the larger portion around the jacket and the smaller portion around a portion of the cable having no jacket.

8. A method according to claim 5, in which the intermediate portion is heat-shrinkable, connection of the electrical power source to the electrodes additionally causing the intermediate portion to shrink and displace heat-activated adhesive.

9. A method according to claim 8, in which the cable comprises a plurality of conductors surrounded by a jacket and in which a cable block is formed, step (b) additionally comprising:
   positioning the tubular article around the cable such that the intermediate portion surrounds a portion of the cable having no jacket;
   the heat-activated adhesive being displaced into interstices between the conductors.

10. A method according to claim 1, in which the cable comprises a plurality of conductors surrounded by a jacket and in which the cable is terminated at the conduit, the method additionally comprising
   (h) removing a jacket from an end portion of the cable, step (b) comprising
      positioning the tubular article around the cable such that the first end portion surrounds the cable at the newly created end of the jacket and the intermediate portion surrounds a portion of the cable having no jacket and the second end portion surrounds the conduit.

11. A method according to claim 1, in which the conduit comprises an outlet of a housing.

12. A method according to claim 1, in which the electrodes comprise longitudinal conductive polymer flanges extending at least part way along the length of the article, steps (c) and (d) comprising connecting the power source to said flanges.

13. A method according to claim 12, in which each of the first, intermediate and second portions has first and second flanges, the first and second flanges of each said portion being separated by about 180° around the circumference of the article; the first flanges of the first, intermediate and second portions being substantially colinear; the first and second flanges of a portion being separated from the first and second flanges of an adjacent portion by an insulating space.

14. A method according to claim 1, in which the article is coated on at least part of its internal surface with a heat-activatable sealing material, steps (c) and/or (d) causing activation of the coated sealing material.

15. A kit-of-parts which comprises:
(a) a tubular article comprising conductive polymeric a material and having two or more elongate electrodes extending at least part way along the length of the article, at least one of which elongate electrodes is interrupted so that an electrical power source can be selectively connected to the article to cause current to pass through
  (i) a first heat-shrinkable end portion of the article
  (ii) a second heat-shrinkable end portion of the article being opposite to the first end portion, and
  (iii) an intermediate portion, between the first and second end portions; and
(b) a heat-activatable sealing material in the form of a tube that can be positioned within the tubular article.

16. A kit-of-parts according to claim 15, in which the tube of sealing material has a first portion of larger cross-section and a second portion of smaller cross-section.

17. A kit-of-parts according to claim 15, in which the tube has a length from 0.5 to 1.5 times the length of the intermediate portion of the tubular article.

18. A kit-of-parts according to claim 16, in which the portion of smaller cross-sections has a length from 0.75 to 1.25 times the length of the intermediate section, and the portion of larger diameter has a length from 0.25 to 0.75 times the length of the first portion of the tubular article.

19. A kit-of-parts according to claim 16, in which the tubular article has length of from 12–36 cms and a diameter of from 1.5 to 5 cm.

20. A kit-of-parts according to claim 15, in which each of the first and second portions has a length of form 3 to 9 cm, and the intermediate portion has a length of from 5–15 cms, the intermediate portion being longer than each said end portion.

21. A kit-of-parts according to claim 15, in which each of the first, intermediate and second portions of the tubular article has a first and second flanges, the first and second flanges of each said portion being separated by about 180° around the circumference of the article; the first flanges of the first, intermediate and second portions being substantially colinear, the first and second flanges of a portion being separated from the first and second flanges of a an adjacent portion by an insulating space.

22. A kit-of-parts according to claim 21, in which the insulating spaces comprise tubular portions of greater diameter that those of the first, intermediate and second portions.

* * * * *

UNITED STATES PATENT AND TRADEMARK OFFICE
CERTIFICATE OF CORRECTION

PATENT NO. : 4,950,343

DATED : August 21, 1990

INVENTOR(S) : Gerald L. Shimirak, et al

It is certified that error appears in the above-indentified patent and that said Letters Patent is hereby corrected as shown below:

Cover Page [56] references cited, U.S. patent documents, line 2 replace "soporm" by--Sopory--.
Column 2, line 65 replace "portions" by--portion--.
Column 3, line 41 replace "substate" by--substrate--.
Column 4, line 61 replace "file" by--filed--.
Column 5, line 47 replace "or" by--of--.
Column 8, line 36 to 37 replace "comprises" by--comprise--.
Column 9, line 2 replace "examply" by--example--.
Column 11, claim 15, line 2, delete "a".
Claim 18, line 2 replace "cross-sections" by--cross-section--.
Column 12, claim 19, line 1, replace "claim 16" by --claim 15--
Claim 20, line 3 replace "form" by--from--.

UNITED STATES PATENT AND TRADEMARK OFFICE
CERTIFICATE OF CORRECTION

PATENT NO. : 4,950,343

DATED : August 21, 1990

INVENTOR(S) : Gerald L. Shimirak, et al

It is certified that error appears in the above-indentified patent and that said Letters Patent is hereby corrected as shown below:

Column 12,

Claim 21, line 3 delete "a".
Claim 21, line 9 replace "of a an adjacent" by --of an adjacent--.
Claim 22, line 3 replace "that" by --than--.

Signed and Sealed this

Eighteenth Day of July, 1995

BRUCE LEHMAN

*Attest:*

*Attesting Officer*         *Commissioner of Patents and Trademarks*